US008326864B2

(12) United States Patent
Agrawal et al.

(10) Patent No.: US 8,326,864 B2
(45) Date of Patent: Dec. 4, 2012

(54) METHOD, SYSTEM, AND COMPUTER PROGRAM PRODUCT FOR IMPLEMENTING AUTOMATED WORKLISTS

(75) Inventors: Prateek Agrawal, Bangaloe (IN); Rishi Arora, Bangalore (IN); Walter C. Dietrich, Yorktown Heights, NY (US); Regina L. Haecker, Stamford, CT (US); Robert Hazeu, Royston (GB); Saurabh Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/254,968

(22) Filed: Oct. 21, 2008

(65) Prior Publication Data

US 2010/0114926 A1    May 6, 2010

(51) Int. Cl.
   *G06F 17/30* (2006.01)
(52) U.S. Cl. .................. 707/769; 707/707; 707/759
(58) Field of Classification Search .................. 707/707, 707/759, 769, E17.014, E17.061, E17.062, 707/E17.069, 999.003, 999.005
   See application file for complete search history.

(56) References Cited

U.S. PATENT DOCUMENTS

| 6,401,085 | B1 | 6/2002 | Gershman et al. |
| 7,114,154 | B1 | 9/2006 | Crohn |
| 7,349,837 | B2 | 3/2008 | Martin et al. |
| 7,945,850 | B2 * | 5/2011 | Machalek ..................... 715/212 |
| 2002/0087386 | A1 * | 7/2002 | Phillips ......................... 705/10 |
| 2003/0028550 | A1 * | 2/2003 | Lee et al. ..................... 707/200 |
| 2004/0133457 | A1 * | 7/2004 | Sadiq et al. ..................... 705/7 |
| 2005/0123892 | A1 * | 6/2005 | Cornelius et al. ............ 434/323 |
| 2006/0026151 | A1 * | 2/2006 | Greene et al. .................... 707/4 |
| 2006/0200792 | A1 * | 9/2006 | Hagstrom et al. ............ 717/101 |
| 2007/0043716 | A1 * | 2/2007 | Blewer et al. ..................... 707/5 |
| 2010/0088137 | A1 * | 4/2010 | Weiss et al. ....................... 705/8 |

OTHER PUBLICATIONS

V. Kaptelinin, et al., The Activity Checklist: A Tool for Representing the "Space" of Context, Methods & Tools, Interactions Jul. and Aug. 1999, 13 pages.
Maria Julia Benini, et al., When Marketing meets Usability: The consumer behavior in heuristic evaluation for web, CLIHC'05, Oct. 23-26, 2005, Cuernavaca, Mexico, 6 pages.

* cited by examiner

*Primary Examiner* — Thu-Nguyet Le
*Assistant Examiner* — Andalib Lodhi
(74) *Attorney, Agent, or Firm* — Cantor Colburn LLP; Louis Percello

(57) ABSTRACT

A method, system, and computer program product for implementing automated worklists are provided. The method includes generating a worklist, which further includes retrieving a worklist template corresponding to the worklist and, via a first query, selecting a listing of members and attributes to be populated in the worklist, the attributes include a status indicator of an action item specified for each of the members of the worklist. The worklist generation also includes building a worklist member table with results of the first query and, via a second query, and using attributes of the worklist member table, identifying up-to-date values of one or more worklist member attributes, and outputting results of the second query to the worklist. The method also includes presenting the worklist to a corresponding assignee. For each of the members in the worklist, the status indicator is editable to update a status of the member.

24 Claims, 8 Drawing Sheets

| ATTRIBUTE | TYPE | LENGTH | PK | FK |
|---|---|---|---|---|
| TEMPLATE ID | Char | 64 | X | |
| TEMPLATE SOURCE | CLOB | 200,000 | | |
| TEMPLATE TYPE | Char | 30 | | |
| DESCRIPTION IN ENGLISH | Varchar | 2048 | | |
| TITLE IN ENGLISH | Varchar | 256 | | |
| VERSION | Char | 10 | | |
| UPDATE TIMESTAMP | TIMESTAMP | | | |

FIGURE 3

| ATTRIBUTE | TYPE | LENGTH | PK | FK |
|---|---|---|---|---|
| TEMPLATE ID | Char | 64 | X | X |
| COUNTRY CODE | Char | 3 | X | X |
| USER ID | Char | 10 | X | X |
| ROW NUMBER | INTEGER | | X | |
| UNIQUE ROW ID | BigInt | | | |
| MEMBER KEY | | | | X |
| IS CHECKED | Char | 1 | | |
| UPDATE TIMESTAMP | TIMESTAMP | | | |

402 TEMPLATE ID
404 COUNTRY CODE
406 USER ID
408 ROW NUMBER
410 UNIQUE ROW ID
412 MEMBER KEY
414 IS CHECKED
416 UPDATE TIMESTAMP

| USER ID | CHECKED FLAG | WORKLIST TEMPLATE ID | DISPUTE KEY |
|---|---|---|---|
| JOHN | No | Disputes_over_1M | Di1 |
| JOHN | No | Disputes_over_1M | Di2 |
| JOHN | No | Disputes_over_1M | Di3 |
| JANE | No | Disputes_over_1M | Di4 |
| JANE | No | Disputes_over_1M | Di5 |
| JANE | No | Disputes_over_1M | Di6 |

FIGURE 5

Worklist Template Schema FIG. 7

METHOD, SYSTEM, AND COMPUTER PROGRAM PRODUCT FOR IMPLEMENTING AUTOMATED WORKLISTS

BACKGROUND

The present invention relates to data processing systems, and more specifically, to a method, system, and computer program product for implementing automated worklists.

Paper checklists (also referred to as worklists) have been used for many years as a way of organizing work. In some applications, such as the aviation industry, such worklists are an important part of aviation preflight processes. The user (also referred to assignee of the worklist) processes each member (e.g., action item) on the list and checks it off when it is completed. When all of the members on the worklist have been checked off, the user knows he/she is done.

In the computer world, there are two analogs for these worklists: static reports and dynamic reports. A static report is generated at a certain point in time and does not change. After the static report is generated, none of the data in the report changes. By contrast, a dynamic report is generated whenever the user wants to see it, and is capable of providing the most current data.

A report could be used as a worklist, whereby the user processes each member in the report and checks each member off when complete. However, if a dynamic report is used, the members in the report could change while the user is processing them, since all of the data is updateable. From a psychological and planning point of view, traditional (static) worklists have two benefits compared to dynamic reports: (1) the user of the worklist can scan the list and estimate how much work is left, and (2) every time the user checks off a member, he/she knows that he/she is one member closer to finishing the worklist. Since the contents of a dynamic report can change, dynamic reports lose these two benefits of the static checklists. While a static report does not suffer from these drawbacks, it also doesn't have all of the benefits of automation (e.g., with automation, it is possible to provide up-to-date information about the members in the report/worklists, but a static report does not allow for this benefit).

What is needed, therefore, is a way to create an automated worklist that contains members that are static, but also contains information about the members that is dynamic.

SUMMARY

According to one embodiment of the present invention, a method for implementing automated worklists is provided. The method includes generating a worklist, which further includes retrieving a worklist template corresponding to the worklist and, via a first query, selecting a listing of members and attributes to be populated in the worklist, the attributes include a status indicator of an action item specified for each of the members of the worklist. The worklist generation also includes building a worklist member table with results of the first query and, via a second query, and using attributes of the worklist member table, identifying updated values of one or more worklist member attributes, and outputting results of the second query to the worklist. The method also includes presenting the worklist to a corresponding assignee. For each of the members in the worklist, the status indicator is editable to update a status of the member.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

FIG. 3 is a definition of a sample table used to store worklist templates and attributes of the worklist templates;

FIG. 4 is a definition of a sample worklist member table, which lists the members of one or more worklists and contains the "is checked" attributes for the members in an exemplary embodiment;

FIG. 5 is a view of a worklist table generated by a first query defined for a worklist template in accordance with an exemplary embodiment;

DETAILED DESCRIPTION

Exemplary embodiments include a method, system, and computer program product for implementing automated worklists. The automated worklists provide the benefits of both static worklists and dynamic worklists. The automated worklist processes utilize various tables and defined queries that are stored in worklist templates and generate customized worklists from this information without the need for any additional program code. In the automated worklist processes, identities of members in a worklist are determined at set points in time (thereby rendering a portion of the worklist static); however, the attributes of the members contain up-to-date information including a current status of any action taken on the worklist (thereby rendering a portion of the worklist dynamic). In an exemplary embodiment, a member of the worklist refers to a database entity (using database terminology) or an instance of a class (using object-oriented terminology). Each of the members of a worklist may represent a row in the worklist, and the collective members in the worklist may be directed to a particular template type, as described further herein. The attributes of a worklist represent any criteria for inclusion in the worklist (e.g., any combination that may be expressed in a database language, such as Structured Query Language (SQL)). Each of the attributes may represent a column in the worklist.

Figure 1:
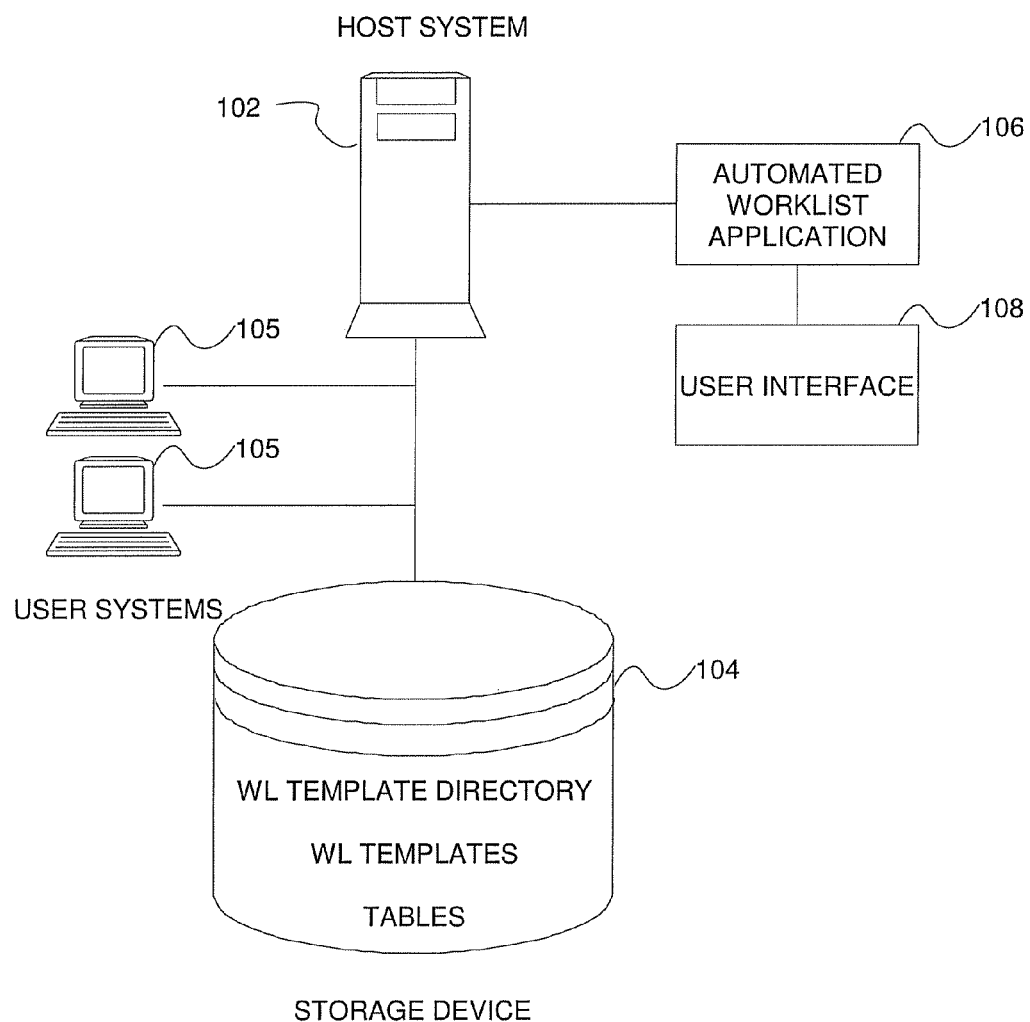
FIG. 1 is a diagram illustrating a system upon which automated worklists may be implemented in accordance with an exemplary embodiment.

With reference now to FIG. 1, a system 100 upon which the automated worklists may be implemented will now be described in an exemplary embodiment. The system of FIG. 1 includes a host system 102 in communication with a storage device 104 and user systems 105. The system 100 supports an automated worklist application 106 that is executed by one or more computer programs located on the host system 102. The automated worklist application 106 supports the collection, storage, retrieval, and modification of worklist-related information and provides computer processes to perform activities in support of the automated worklists.

The computer programs that form the automated worklist application 106 and which are used to execute the automated worklist processes include modules or components, e.g., a parsing engine, a programming language, e.g., Java™, user interface web pages, and an XML-based schema. The XML-based schema may be used to create, modify, and/or delete worklist templates. The parsing engine may be implemented to parse the worklist templates (implemented as XML files) based upon the XML schema and convert the parsed elements into Java™ objects, which may in turn be used to create a worklist. The Java™ code uses the Java™ objects to fetch the data using, e.g., SQL queries defined in the worklist template, format the output based upon the worklist template, and send the worklist to a user using, e.g., HTML or Java Server Pages™ (JSPs). The user interface pages may be designed via a user interface 108 based on the display requirements of the worklist. A generic worklist web page may be designed in order to deploy worklist templates by pushing worklist templates into a worklist template directory.

The host system 102 may be in direct communication with the storage device 104 and/or the user systems 105, or may be coupled to the storage device 104 and/or user systems 105 via, e.g., one or more wireline or wireless networks (not shown). It is understood that the storage device 104 may be implemented using memory contained in the host system 102 or it may be a separate physical device. The storage device 104 may be logically addressable as a consolidated data source across a distributed environment that includes a network (not shown).

The storage device 104 stores a worklist template directory that provides a listing of the available worklist templates. Alternatively, the listing of available templates could be stored in a database instead of a directory. The storage device 104 also stores the worklist templates, as well as business data. Business data may include any type of data, reports, information, etc., typically found in a business enterprise. For illustrative purposes, the business data used in implementing the automated worklist processes described herein relate to a global debt management system (GDMS). However, other types of business data may alternatively be employed with respect to the enterprise of the host system 102. The illustrative examples of business data are provided herein for illustrative purposes only and are not to be construed as limiting in scope.

In an exemplary embodiment, the host system 102 operates as a database server and coordinates access to application data including data stored on the storage device 104. The host system 102 may be implemented using one or more servers operating in response to a computer program stored in a storage medium accessible by the server. The host system 102 may operate as a network server (e.g., a web server) to communicate with the user systems 105. The host system 102 may be implemented as a high-speed processing device (e.g., a mainframe computer) and handles sending and receiving information to and from the user systems 105.

The host system 102 may also operate as an application server (e.g., IBM® Websphere Application Server). The host system 102 executes one or more computer programs (e.g., the automated worklist application 106). One of the automated worklist application functions provided by the host system 102 is a search tool (e.g., IBM® Database Management System) to allow a user (e.g., an individual responsible for managing the worklist templates) to search for information in the storage device 104.

The user systems 105 may be operated by users (e.g., assignees) of the worklists. The user systems 105 may be implemented as general-purpose computers or desktop devices. Processing may be shared by the user systems 105 and the host system 102 by providing an application (e.g., Java™ applet) to the user system 105. As previously described, it is understood that separate servers may be utilized to implement the network server functions and the application server functions. Alternatively, the network server and the application server may be implemented by a single server executing computer programs to perform the requisite functions.

As indicated above, the automated worklist processes generate worklists that contain features of both static and dynamic worklists. In an exemplary embodiment, the automated worklists contain a static listing of members and attributes that is set at a particular point in time and remains unchanged for a specified duration of time. In addition, the automated worklists contain values for the members and attributes of the members, at least a portion of which are updateable on demand by an assignee of the worklist or at the beginning of a schedule period (e.g., a batch update at the beginning of a work day).

Figure 2:
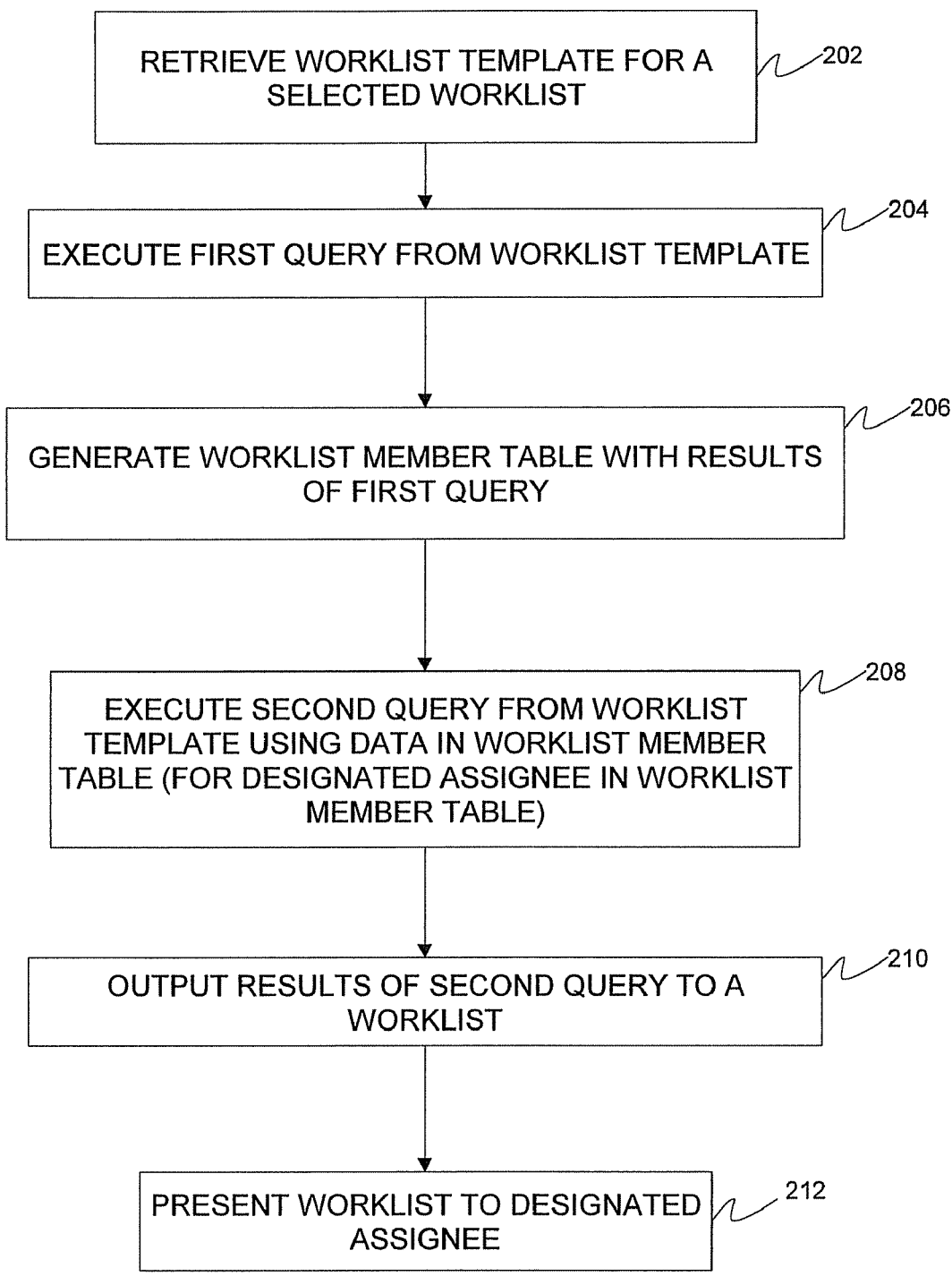
FIG. 2 is a flow diagram describing a process for implementing the automated worklists in an exemplary embodiment.
Figure 7:
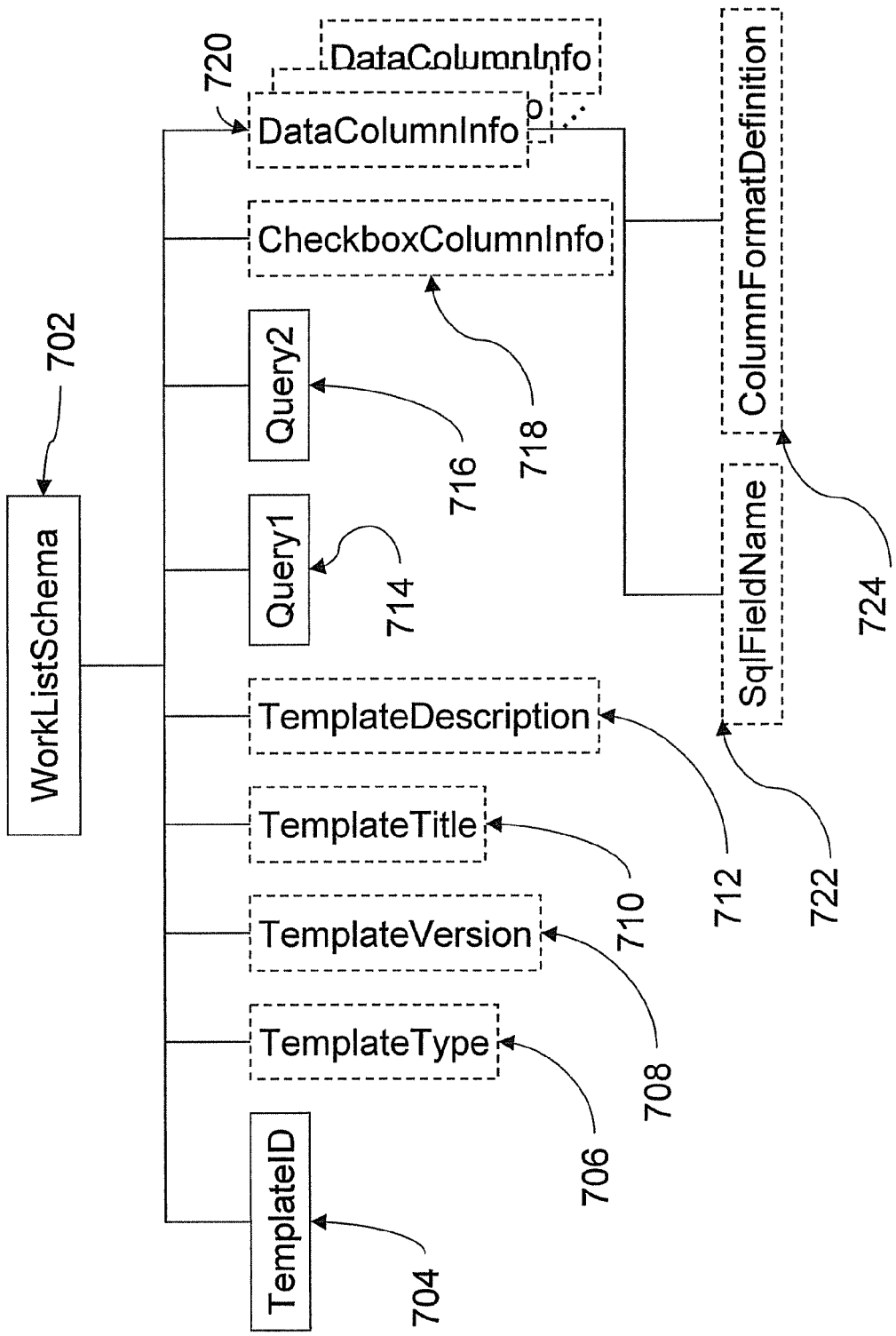
FIG. 7 is a diagram depicting a sample worklist template schema in an exemplary embodiment.

Turning now to FIG. 2, an exemplary process for implementing the automated worklists will now be described. As indicated above, worklist templates that define the worklists are created using a generic worklist table and various other tables/data, and are stored in the storage device 104. A sample worklist template schema 702 is shown in FIG. 7. In an exemplary embodiment of the invention, every worklist template conforms to this schema. A definition of a sample generic table 300 used to store the worklist templates and associated information is shown in FIG. 3. In this sample table 300, worklist templates are stored in the table 300, and other information may be stored in the table 300. Using the attributes in the generic table 300, a template ID field 302 is used to uniquely identify a worklist template. For example, using the GDMS example outlined above, column 506 of a view 500 shown in FIG. 5 illustrates a template ID: "Disputes_over_1M." The value in the template ID field 302 for a given row may be the same as the value of a TemplateID field 704 (see FIG. 7) of the template that is stored in the template source field 304 of the same row. Template ID field 302 may be implemented in the table for convenience. It can allow for simple and fast retrieval of worklist templates based on worklist ID. Some of the other fields in the sample worklist template table 300 may also be duplicates of fields that are stored in the worklist templates. For example, the "title in english" field 308 may be a duplicate of a TemplateTitle field 710, which is shown in FIG. 7.

A first query is defined for the worklist template. The first query is in field query1 714 of the template. The first query is defined to select a listing of members to be populated in the worklist. A second query is also defined for the worklist template. The second query is in field query2 716 of the template. The second query is defined to utilize attributes of a worklist member table to identify up-to-date values of one or more of the "worklist member attributes." A "worklist member attribute" is an attribute that appears in the worklist that is presented to an end user. A worklist member attribute does not need to be an attribute in the entity-relationship modeling sense of the word. The second query may fetch data from other sources, such as other database tables, and may perform computations expressible in the query language in order to identify the values of the worklist member attributes. The contents of the worklist template defined above are stored using an attribute 304 "template source" in the table 300. The worklist template might be represented using a markup language such as XML. Other attributes that may be defined for the worklist template table 300 include "template type" 306, "description in English" 308, "title in English" 310, "version" 312, and "update timestamp" 314. The template schema 702 of FIG. 7 defines attributes that may or may not be in the worklist template table 300. For example, it defines query1 714 and query2 716. An exemplary embodiment also defines the following fields, which are not required by the invention, but are convenient for the explanation: one or more DataColumnInfo fields 720 that in turn contains a SqlFieldName field 722 and a ColumnFormatDefinition field 724, which are used to specify information that is used when presenting the worklist on a user system 105; a TemplateType field 706 that specifies an entity type (as will be described further herein); a TemplateVersion field 708 that can be used to specify the version of the template; a Template Description field 712, which can be used to automate the display of information about templates and worklists; a CheckboxColumnInfo field 718, which can be used to specify database information and/or information about how to display the status indicator on a user system 105.

The template source attribute 304 may be used by batch jobs to retrieve the contents of the corresponding worklist template in response to initiating the generation of a worklist, as will be described further herein. The template type attribute 306 specifies an "entity-type," using the definition of entity-type that is used in entity-relationship (ER) modeling. For example, using the GDMS example above, template types may include "Disputes," "Account Receivable Items," "Customers," or other GDMS-related subject matter. Likewise, within each of the defined template types, there may be multiple defined worklist templates. Using the above GDMS example, the worklist template ID 506 in view 500 is generated based upon the worklist template that has template type "Disputes" and that has template ID "Disputes_over_1M." Results of the first query are provided in a worklist member table 400 and include members having the template type specified in the worklist template.

The description in English attribute 308 provides a description of the worklist in English. The title in English attribute 310 is the title of the worklist in English. The version attribute 312 references the version of the worklist template. The version attribute 312 is a field in the worklist template that may be stored in a source code control system of the host system 102. The update timestamp attribute 314 provides the date and time the row in the worklist template table was last modified.

The generic table 300 of FIG. 3 also includes field information (e.g., in columns 320 and 322), as well as key information (e.g., primary key field 324 and foreign key field 326). As shown in FIG. 3, e.g., the template ID attribute 302 is a primary key into the generic table 300.

A separate table may be created for each template type. For example, using the GDMS example, the following tables may be generated: table for defining worklist members for account receivable item worklists (referred to as "AR1 table"), worklist members for account receivable item action worklists (referred to as "AR2 table"), worklist members for customer worklists (referred to as "Customer table"), and worklist members for dispute worklists (referred to as "dispute table").

It should be understood by one skilled in the art that the template type may not be necessary in some situations. Template type captures the entity type of the members of a worklist. There are at least two situations where a template type is not required. If all of the worklist templates will define members that are of the same entity type, the template type can be implicit in the embodiment, rather than explicitly defined by a template type. There is another situation that does not require a template type. Recall that the worklist member tables contain the primary key of the members. Since different entity types can have different primary key definitions, different worklist member tables may be required for each type of member. However, if all member entity types use the same primary key definitions, only one worklist member table is needed, and no template type field 706 is needed. This can occur, for example, when the primary keys of all entities are surrogate keys that have the same definition. Requiring a template type has advantages and disadvantages. For example, embodiments that include a template type do not restrict the range of entity types that can be used and allow for more automated error checking. Embodiments that do not include a template type, where applicable, allow the use of one worklist member table, rather than one per entity type. Since the creation of a new table may require a database administrator (DBA), an implementation that only requires one table may be advantageous.

For each of these worklist member tables (e.g., worklist member table 400), various attributes are defined. As shown in FIG. 4, table 400 contain a "template ID" attribute 402, a "country code" attribute 404, a "user ID" attribute 406, a "row number" attribute 408, a "unique row ID" attribute 410, a "member key" attribute 412, an "is checked" attribute 414, and an "update timestamp" attribute 416.

The template ID attribute 402 serves as a foreign key to the generic worklist template table 300 of FIG. 3. The country code attribute 404 is a foreign key to the entity country defined in another table. The country code is an optional feature and is not required in order to realize the advantages of the invention. The country code illustrates a scenario in which the embodiments are used in systems having entities which have multi-part keys. In one exemplary embodiment, end users are identified by keys that include a "country code" field. For example, "user id" values are only unique within a country. Uniquely identifying an end user may be implemented using a combination of "user id" and "country code." The user ID attribute 406 is a foreign key. The country code attribute 404, together with the user ID attribute, form a foreign key to a table that has information about an assignee, which is a user of the worklist template. The user ID attribute 406, together with the country code attribute 404, identifies the assignee of the worklist to be generated from the worklist template.

The row number attribute 408 is used for sorting members in a worklist. The order of the members in the worklist may be determined when the initial selection query (first query) is run. The order of the members in the worklist may be saved by putting row number values from the first query into the row number attribute. When that first query runs for a country-user ID combination, the results are inserted into this table 400. Taken together, the template ID 402, country code 404, user ID 406, and row number 408 can be used as the primary key to this table. The unique row ID attribute 410 provides a unique value for code that uses the corresponding table (i.e., corresponding worklist member table). Each row has a unique value. The member key attribute 412 specifies a primary key for a member of a worklist for a certain worklist template for a certain user ID for a specified country and for a certain row number. For example, in the "Customer table" defined above, member key 412 is a foreign key that refers to the business data about customers. The "is checked" attribute 414 specifies whether the member has been checked or not. The "is checked" attribute 414 represents the status indicator described above. This attribute 414 corresponds to the "checked flag" column 504 shown in FIG. 5, as well as the "checked off" column 602 shown in FIG. 6. These represent a status indicator for an action item associated with a worklist member. The action item may be defined as any action prescribed for the user with respect to the member of the worklist. For example, the action item may include acknowledging the member or completing a task with respect to the action item. The update timestamp attribute 416 specifies the most current modification date and time associated with the corresponding row of the worklist member table. The update timestamp attribute 416 is an optional feature and is not necessary to realize the advantages of the invention.

In addition to these tables, a worklist control table (not shown) may be generated for managing the scheduling aspects of the worklist generation processes. As with the worklist template table 300, the worklist control table includes a template ID attribute, a country code attribute, and an update timestamp attribute. In addition, the worklist control table includes a "schedule" attribute that defines the schedule of the worklist in terms of frequency (e.g., generate a worklist daily, weekly, monthly, etc.). The schedule attribute may also define the duration of the worklist (the worklist is valid for a defined period of time). The worklist control table may also include an "is deleted" attribute that specifies the deletion of a row in the table. In an exemplary embodiment, when there is a row in the worklist table that is defined for a particular worklist template and also a country code has been specified, then that country uses the respective worklist template. In this manner, differing versions of a worklist template may be customized depending upon the country that implements the worklist template. Note that although the primary key identifying assignees in the exemplary embodiment includes a country code field, assignees can participate in worklists that contain members from any number of countries. If necessary, a second "country code" field can be added to the worklist member table 400 to identify the country for which the worklist template was executed. In many cases this may not be necessary, particularly where the worklists for different countries do not contain any of the same members.

Once the worklist template has been created, it is stored in the storage device 104, and a worklist may now be generated from the worklist template (i.e., the worklist template defined by the table 300 and corresponding worklist member table) as will now be described. At step 202, the worklist template corresponding to the worklist to be generated is retrieved from the worklist template directory or from the worklist template table 300. As indicated above in FIG. 1, the parsing engine may be implemented to parse the worklist template based upon the worklist template schema and convert the parsed elements into objects in the implementation's programming language. At step 204, the first query defined in the worklist template (e.g., via the template source attribute 304) is executed, e.g., via Java™ code that uses the Java™ objects to fetch the data using, e.g., SQL queries defined in the worklist template.

At step 206, a worklist table is populated from the results of the first query. As described above, if the embodiment's template schema includes a "template type," type-specific worklist member tables are used in the embodiment. If the embodiment's template schema includes a template type, a type-specific worklist table is populated from the results of the first query. Some columns and rows 500 of a sample worklist table are shown in FIG. 5. This is a view of a sample worklist. The design of a worklist member table 400 is shown in FIG. 4. The view 500 specifies worklist members for a number of assignees resulting from the first query. As shown in FIG. 5, e.g., the worklist table includes members for two assignees: John and Jane. The view 500 is directed to a worklist template type "Disputes," having a worklist template ID for generating worklists that include information on disputes that are over one million dollars. The view 500 includes a listing of members (in a DisputeKey column 508) for each assignee in column 502, along with the "is checked" field. During step 206, the "is checked" field 414 in each row that is put into the worklist member table 400 is set. In one embodiment of this invention, this field is set by having the field be part of the result of query1. One skilled in the art should understand that another embodiment of this invention would automatically set this field to "No" without requiring "No" to be in each row of the result of query1. Each embodiment has pros and cons. For example, the first embodiment allows some "is checked" values to be "Yes" as soon as query1 is run. The alternate embodiment allows simpler versions of query1 if the initial value of "is checked" will always be "No."

It should be understood by one skilled in the art that in some embodiments of the invention, steps 204 and 206 are executed once for each worklist template. In these embodiments, step 204 generates results for all of the assignees of the worklist and step 206 builds a worklist member table using the result of step 204. One skilled in the art should also understand that in other embodiments, steps 204 and 206 could be executed in a loop. In each execution of the loop, a different potential assignee is used. In step 204, the entity representing a potential assignee is passed to the query. In step 206, the results of the query, if there are any, together with the primary key field(s) of the assignee, are added to the worklist member table. If there are no results for an assignee, step 206 is skipped. The loop finishes when each potential assignee has been used. Embodiments that do not use a loop may allow more optimization of the execution of the query. Embodiments that use a loop may be easier for programmers to use because the programmers only have to write a query that works for one user at a time. As can be seen by one skilled in the art, each alternative has different pros and cons.

Figure 6:
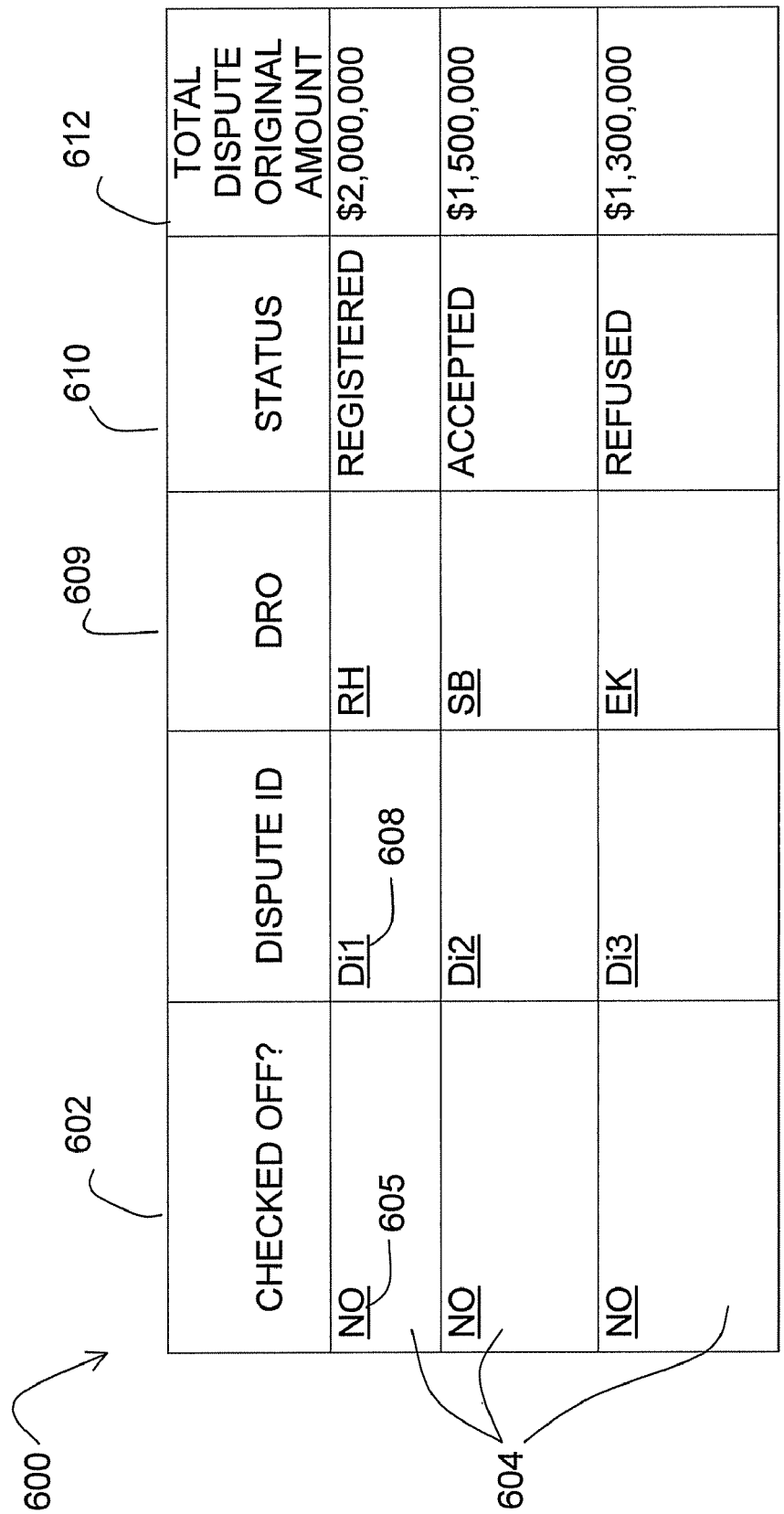
FIG. 6 is a user interface screen depicting a worklist generated as a result of a second query defined for the worklist template and using data from the worklist table view of FIG. 5 in an exemplary embodiment.

At step 208, the second query defined in the worklist template is executed. The second query uses attributes of the worklist member table 400 to identify values of one or more of the member attributes associated with members in the worklist. At step 210, the results of the second query are output to the worklist. A sample worklist 600 generated from the worklist member table underlying worklist member table view 500 is shown in FIG. 6.

Once the worklist is generated, it is ready for viewing/action by an assigned user (assignee) for which the worklist has been generated. At step 212, the worklist is presented to the assignee, using, e.g., HTML or Java Server Pages™ (JSPs). The sample worklist 600 is generated for the user ID (in column 502), which is John.

There are three members 604 in John's worklist. The number of members (i.e., three) does not change for this worklist (i.e., it are static). However, the values in one or more columns (i.e., attributes) can change. For example, the checked off column 602 includes status indicators reflecting a current status of the respective members with respect an action specified for the assignee. As shown in FIG. 6, e.g., the status indicators are set to "No," reflecting that the assignee has not completed the action or task defined for the members. The worklist 600 is presented to the assignee in the form of a web page. The status indicator may be updated by the assignee via a hyperlink 605 associated with the status indicator for each member in the worklist 600. Likewise, a hyperlink 608 is enabled for the Dispute ID column which, when selected, provides descriptive information concerning the dispute associated with the member. In column 609, a designated entity ("DRO", for Dispute Resolution Owner) may also include a hyperlink to retrieve additional information concerning an entity responsible for the particular dispute item. Other attributes, such as "status" in column 610, and "total original dispute amount" in column 612 may be defined for the worklist via the respective worklist template. It should be noted that in this example, "status" is a field that specifies the business status of the dispute (registered, accepted, refused, etc.) rather than the "status indicator" described previously above. Query 2 specifies the searches and calculations that define the values DRO, Status, and Total Dispute Original Amount. DRO, Status and Total Dispute Original Amount are examples of "worklist member attributes."

Typically, steps 208 to 212 are executed whenever an end user wants to see an up-to-date version of a worklist that has been assigned to him or her. As stated previously, the members of the worklist are computed by query 1, but the worklist attribute members are computed by query 2. Since query2 can be executed at any time, the worklist attribute members are dynamic.

As indicated above, the worklist template may include a schedule period defined by an administrator of the automated worklist process via, e.g., the schedule attribute of the worklist control table. Also, as indicated above, the template ID 302 of the worklist template may be configured as a key to a table that identifies a country to which the worklist template is assigned (via the country code attribute 404). In this manner, the worklist is populated with members and attributes defined for the country identified by the template ID.

Figure 8:
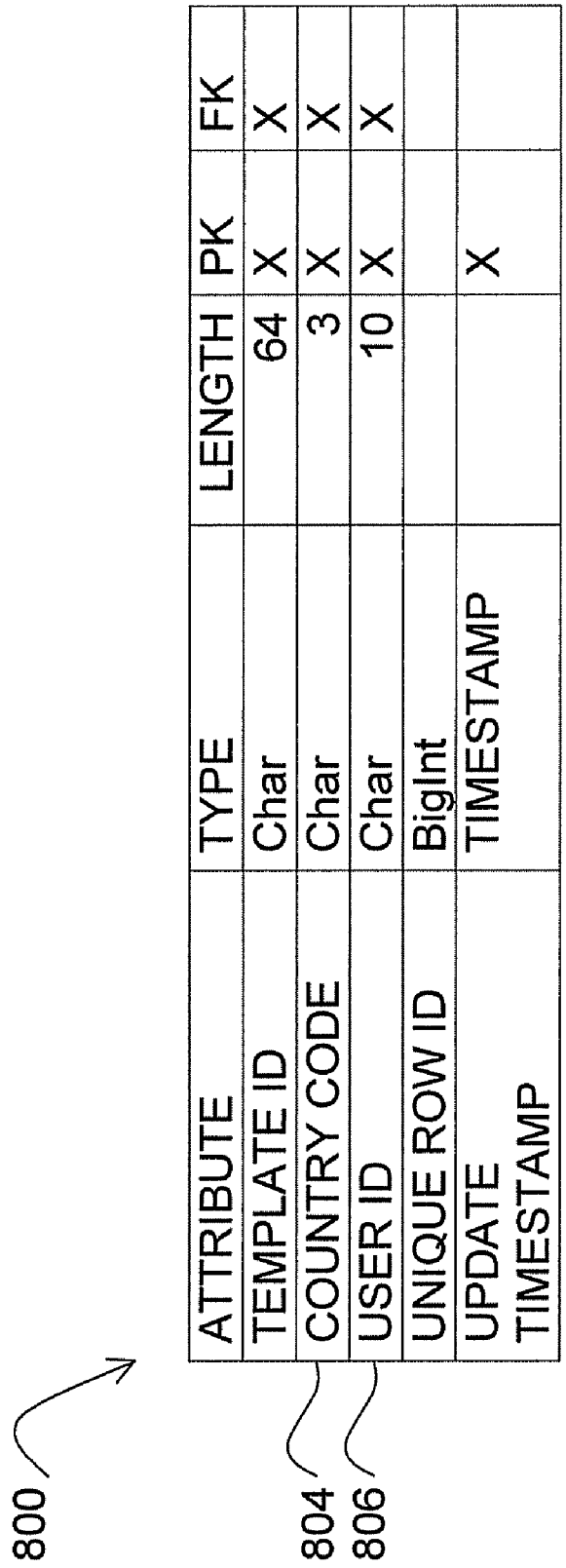
FIG. 8 is a sample worklist-user table in an exemplary embodiment.

In addition, the template ID of the worklist template may also be configured as a key to a worklist-user table that identifies the assignee to which the corresponding worklist is associated. A sample worklist-user table 800 is shown in FIG. 8. Thus, the worklist is populated with members and attributes defined for the assignee identified by the template ID. In this case, there can be assignees identified by the User ID 406 and Country Code 404 attributes in table 400 that are the same as assignees associated with the template ID in the worklist-user table (shown in table 800 as User ID 806 and Country Code 804).

It will be understood that the automated worklist processes may be implemented using various alternatives. For example, in one alternate exemplary embodiment, the present invention may be implemented by representing the worklist templates using a set of database tables, in lieu of a markup language. In another alternate exemplary embodiment, the present invention may be implemented by storing the worklist templates in a set of database tables, in lieu of documents that are retrieved from external storage media, such as storage device 104. In a further exemplary embodiment, the worklists may be presented to assignees by using alternative user interface technologies, such as smart phones, PDA's, green screens, electronic books, and voice response systems, to name a few. In yet a further alternate exemplary embodiment, the worklists may be presented to users one-item-at-a-time, in lieu of the pages (e.g., the worklist shown in FIG. 6) that show all of the members of a worklist. These, and other modifications may be used to implement the automated worklist processes.

The above-described automated worklist processes enable an assignee to plan his/her work efficiently because it is understood that the members on the list will not change and that the number of remaining members on the worklist is always known. Further, the system can provide up-to-date information about the members in the worklist, either on demand or at a designated time (e.g., the beginning of the schedule period). Storage requirements may be minimized as the system stores only the identities of the members of the worklist, rather than the whole report.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for implementing automated worklists, comprising:
generating a worklist, comprising:
retrieving a worklist template corresponding to the worklist from a storage device;
creating the worklist template that defines the worklist by specifying a template ID for the worklist template, defining the first query, storing the first query in the worklist template, defining the second query; and storing the second query in the worklist template;
via a first query stored in the worklist template, selecting a listing of members, member attributes, and an assignee and populating the listing of members, member attributes, and the assignee in the worklist, the member attributes including a status indicator of an action item specified for each of the members of the worklist;
via a second query stored in the worklist template, and using attributes of a worklist member table corresponding to the member attributes, identifying up-to-date values of the member attributes; and
outputting the up-to-date values to the worklist; and
presenting the worklist to the assignee, wherein for each of the members in the worklist, a value of the status indicator is editable by the assignee to update a status of the member.

2. The method of claim 1, further comprising:
storing the worklist template in a worklist template table that provides a primary key for worklist templates that is used as a foreign key in other tables that refer to the worklist templates.

3. The method of claim 1, wherein the members comprise a database entity and occupy rows of the worklist.

4. The method of claim 1, wherein creating the worklist template further includes specifying a schedule period of worklist generation for the worklist template, the schedule period defined by at least one of frequency of generation and duration of schedule period.

5. The method of claim 4, wherein the worklist contains a static listing of the members that is unchanged for the duration of the schedule period, and the values of at least one of the member attributes are updateable on demand via the worklist by the assignee.

6. The method of claim 1, further comprising:
specifying a template type for the worklist template;
wherein results of the first query include members having the template type specified in the worklist template, the template type referencing a group of attributes, each of which relates to a defined subject.

7. The method of claim 1, wherein each worklist template has a unique template ID and the template ID is a key to a table that identifies a country to which the worklist template is assigned;
wherein, generating the worklist includes populating the worklist with members and attributes defined for the country identified by the template ID.

8. The method of claim 1, wherein each worklist template has a unique template ID and the template ID is a key to a worklist-user table that identifies at least one assignee to which the corresponding worklist template is associated;
wherein, generating the worklist includes populating the worklist with members and attributes defined for the assignee identified by the template ID.

9. A system for implementing automated worklists, comprising:
a host system; and
an automated worklist application executing on the host system, the automated worklist application implementing a method, the method comprising:
generating a worklist, comprising:
retrieving a worklist template corresponding to the worklist from a storage device;
creating the worklist template that defines the worklist by specifying a template ID for the worklist template, defining the first query, storing the first query in the worklist template, defining the second query; and storing the second query in the worklist template;
via the first query stored in the worklist template, selecting a listing of members, member attributes, and an assignee, and populating the listing of members, member attributes, and the assignee to in the worklist, the member attributes including a status indicator of an action item specified for each of the members of the worklist;
via a second query stored in the worklist template, and using attributes of a worklist member table corresponding to the member attributes, identifying up-to-date values of the member attributes; and
outputting the up-to-date values to the worklist; and
presenting the worklist to the assignee, wherein for each of the members in the worklist, the status indicator is editable by the assignee to update a status of the member.

10. The system of claim 9, wherein the automated worklist application further implements:
storing the worklist template in a worklist template table that provides a primary key for worklist templates that is used as a foreign key in other tables that refer to the worklist templates.

11. The system of claim 9, wherein the members comprise a database entity and occupy rows of the worklist.

12. The system of claim 9, wherein creating the worklist template further includes specifying a schedule period of worklist generation for the worklist template, the schedule period defined by at least one of frequency of generation and duration of schedule period.

13. The system of claim 12, wherein the worklist contains a static listing of the members that is unchanged for the duration of the schedule period, and the values of at least one of the member attributes are updateable on demand via the worklist by the assignee.

14. The system of claim 9, wherein the automated worklist application further implements:
specifying a template type for the worklist template;
wherein results of the first query include members having the template type specified in the worklist template, the template type referencing a group of attributes, each of which relates to a defined subject.

15. The system of claim 9, wherein each worklist template has a unique template ID and the template ID is a key to a table that identifies a country to which the worklist template is assigned;
wherein, generating the worklist includes populating the worklist with members and attributes defined for the country identified by the template ID.

16. The system of claim 9, wherein each worklist template has a unique template ID and the template ID is a key to a worklist-user table that identifies at least one assignee to which the corresponding worklist template is associated;

wherein, generating the worklist includes populating the worklist with members and attributes defined for the assignee identified by the template ID.

17. A computer program product for implementing automated worklists, the computer program product including a non-transitory computer-readable storage medium having computer program instructions embodied thereon, the program instructions causing a computer to implement a method, comprising:
   generating a worklist, comprising:
      retrieving a worklist template corresponding to the worklist from a storage device;
      creating the worklist template that defines the worklist by specifying a template ID for the worklist template, defining the first query, storing the first query in the worklist template, defining the second query; and storing the second query in the worklist template;
      via the first query stored in the worklist template, selecting a listing of members, member attributes, and an assignee to be populated in the worklist, and populating the members, member attributes, and the assignee in the worklist, the member attributes including a status indicator of an action item specified for each of the members of the worklist;
      via a second query stored in the worklist template, and using attributes of a worklist member table corresponding to the member attributes, identifying up-to-date values of the member attributes; and
   outputting the up-to-date values to the worklist; and
   presenting the worklist to the assignee, wherein for each of the members in the worklist, a value of the status indicator is editable by the assignee to update a status of the member.

18. The computer program product of claim 17, further comprising instructions for implementing:
   storing the worklist template in a worklist template table that provides a primary key for worklist templates that is used as a foreign key in other tables that refer to the worklist templates.

19. The computer program product of claim 17, wherein the members comprise a database entity and occupy rows of the worklist.

20. The computer program product of claim 17, wherein creating the worklist template further includes specifying a schedule period of worklist generation for the worklist template, the schedule period defined by at least one of frequency of generation and duration of schedule period.

21. The computer program product of claim 20, wherein the worklist contains a static listing of the members that is unchanged for the duration of the schedule period, and the values of at least one of the member attributes are updateable on demand via the worklist by the assignee.

22. The computer program product of claim 17, further comprising instructions for implementing:
   specifying a template type for the worklist template;
   wherein results of the first query include members having the template type specified in the worklist template, the template type referencing a group of attributes, each of which relates to a defined subject.

23. The computer program product of claim 17, wherein each worklist template has a unique template ID and the template ID is a key to a table that identifies a country to which the worklist template is assigned;
   wherein, generating the worklist includes populating the worklist with members and attributes defined for the country identified by the template ID.

24. The computer program product of claim 17, wherein each worklist template has a unique template ID and the template ID is a key to a worklist-user table that identifies at least one assignee to which the corresponding worklist template is associated;
   wherein, generating the worklist includes populating the worklist with members and attributes defined for the assignee identified by the template ID.

* * * * *